Figure 1:
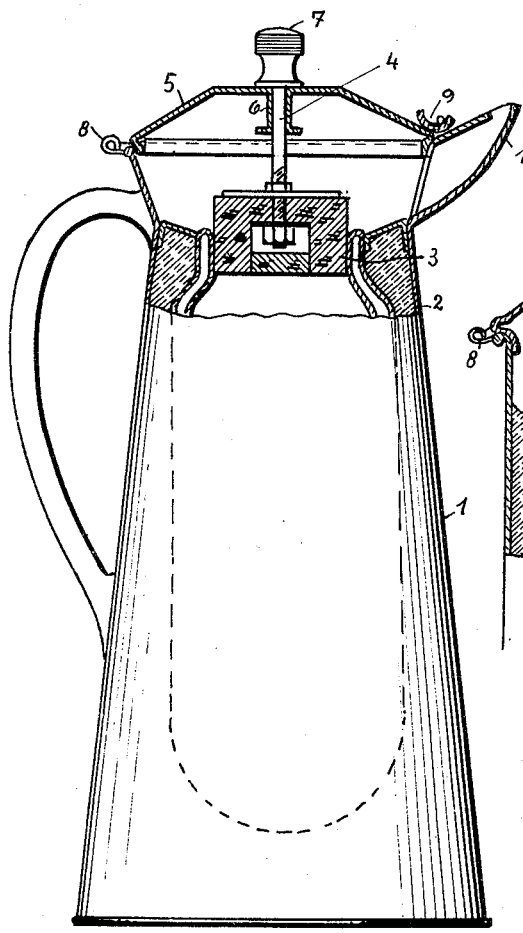

Jan. 15, 1935.  W. VOSS  1,988,223
CLOSURE FOR HEAT INSULATED CONTAINERS
Filed May 1, 1931

W. Voss, INVENTOR
By: Marks & Clerk
ATTYS.

Patented Jan. 15, 1935

1,988,223

UNITED STATES PATENT OFFICE 1,988,223

CLOSURE FOR HEAT-INSULATED CONTAINERS

Walter Voss, Berlin-Neukolln, Germany

Application May 1, 1931, Serial No. 534,348
In Germany April 9, 1930

3 Claims. (Cl. 220—29)

This invention has reference to containers for liquid and other food and for other purposes with an interior heat-insulating vessel constructed in accordance with the principle of the well-known Dewar heat-insulating containers and it is particularly intended to improve the closing means of such containers. For the purpose of providing a satisfactory closure for containers of this kind as for instance for bottles, coffee pots, tea pots and the like it is not sufficient to apply a closing cover or lid engaging the upper edge of the container, pot or the like, but a special stopper was necessary for the closing of the heat-insulated vessel which was inserted and supported in any suitable manner in the interior of the container. In order to be able to pour out the liquid from such container it is necessary always to remove the stopper of the interior insulating vessel and this stopper has to be re-inserted tightly for the purpose of maintaining the heat-insulating action of the insertion vessel. With the forms of construction of pots or other containers with interior insulating vessel it is necessary to first open the closing cap or lid of the container in order to be able to withdraw the stopper of the insulating vessel for the purpose of emptying its contents. It is inconvenient moreover that during the pouring out this stopper has to be placed onto a support separate from the container. The use of such containers, pots or the like is therefore more or less complicated and there is the drawback that a considerable amount of heat is lost and radiated to the atmosphere by the necessity of opening the exterior cap and the stopper of the insulating vessel completely and simultaneously. Moreover, the taking out of the closing stopper of the insulating vessel, which has been soiled with liquid and the positioning thereof outside of the container during the pouring out of the contents is objectionable and not hygienic and very often causes the soiling of the parts of the support around the container.

Now, in accordance with this invention these difficulties are overcome in a simple manner by the fact that the closing stopper of the interior insulating vessel is displaceably arranged upon the cap or lid of the bottle, pot or the like in such a manner that by means of a handle or the like which is operated upon the outside of the container or of the lid the stopper for the interior vessel may be forced into the neck of this vessel or may be withdrawn therefrom. The closing stopper may be guided displaceably within the cover or lid by means of a guide rod or the like provided with a handle for the displacement of the stopper and arranged upon the outer surface of the cap. The stopper may also be rockingly disposed upon the inside of the cap and may be moved from the opening position into the closing position and inversely by the operation of a lever projecting through the cover or cap and secured thereto and provided with a suitable exterior handle. Instead of providing the closing stopper on the cover, lid or cap of the pot or the like it may also be displaceably guided or rockingly arranged at the upper end of the pot or container above the inserted insulating vessel, in which case the cap or cover of the container serves merely for the guiding and for the support of the handle intended for the operation of the stopper.

With the closure according to the invention and as hereinbefore characterized it becomes possible to pour out beverages or other liquids from the container any number of times without the necessity of uncovering the cap or lid. A mere raising or rocking of the handle for the closing stopper is sufficient for the purpose of withdrawing the stopper from the insulating vessel or to detach it therefrom and to open it without the necessity of removing the cap or lid in order to empty the vessel. By moving the handle in the opposite direction the insulating vessel is hermetically closed by the re-insertion of the closing stopper. There is no necessity of removing the stopper from the container in the opening and closing operations. Thus, the stopper is not uncovered in the emptying operation and losses of heat is avoided by the fact that the cover or cap of the container is kept closed. The operation of the device is very simple and rapid and clean and the stopper may be easily exchanged whenever desired. The construction of the container does not require to be altered by the mounting and the guiding of the stopper and the necessary additional parts may be easily disposed on the cover or cap. The stopper, moreover, may be detachably connected to its supporting or guiding means.

Figure 2:
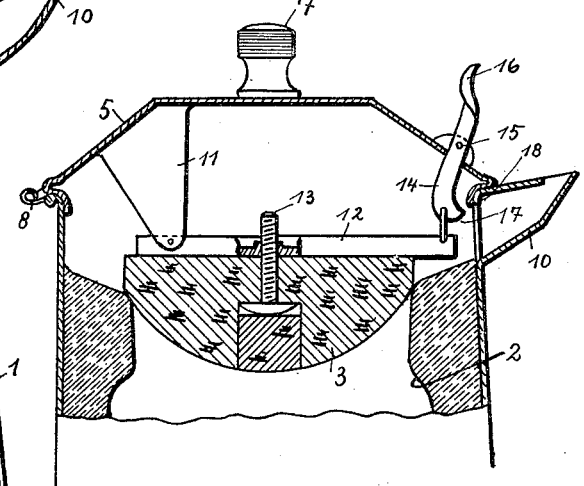
Figure 3:
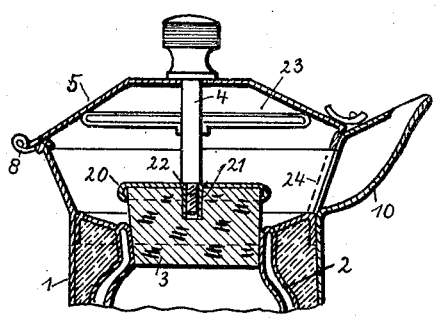

The invention is shown on the accompanying drawing by way of example in three different embodiments in Figures 1, 2, 3 in vertical section and partly in elevation.

In accordance with the embodiment of Fig. 1 a tea or coffee pot of sheet metal or the like may be used which is provided with a Dewar interior insulating vessel 2 adapted to be closed by means of a stopper 3 of cork or other suitable material. The stopper 3 is connected to a spindle or shaft 4 which is secured to the stopper by means of screws and nuts and washers or the like and which projects through the cap or lid 5 of the pot 1. This lid, cover or cap 5 is provided with an interior guide sleeve 6 for the spindle 4 the free end of which outside of the cover 5 is provided with a knob or handle 7. The cover or lid 5 is pivoted to the container 1 by means of hinges 8 and it may be maintained in its closing position by a spring-acting tongue, lug or the like 9 which is yieldingly disposed upon the upper wall of the spout 10. Instead of the spring-acting tongue 9 the container may be provided with a movable spout which may be swung into a position in which it overlaps the lid 5 somewhat and yieldingly and detachably retains the same in position similar to the tongue 9. By the raising of the handle 7 the stopper 3 is withdrawn from the insulating vessel 2 and is moved to the opening position indicated in dotted lines. In this position the liquid may be poured out from the container without the necessity of swinging the cover 5 into the opening position. By lowering the handle 7 the stopper may be restored to the closing position. If it is desired to clean the stopper 3, it is only necessary to open the cover 5 by a somewhat forcible pulling of the handle 7, whereby the stopper 3 becomes accessible.

In the modification according to Fig. 2 the closing stopper 3 is rockingly disposed upon a bracket 11 projecting downwards from the cap or cover 5. In this embodiment the stopper 3 may be supported by means of the screw-bolt 13 in a U-shaped or channelled bar 12, for instance, one end of which is pivoted to the bracket 11, while the other end of the bar 12 is linked to a lever 14 which is adapted to be rotated on a stud 15 disposed in or on the cover 5. The lever 14 projects through the cover 5 and its exterior extension constitutes a handle 16 by means of which the lever may be rocked in such a manner that its inner extremity will lift the stopper 3 out of the neck of the insulating vessel 2, while by the inverse movement of the handle 16 the stopper 3 is forced back into the insulating vessel. At its inner end the lever 14 is provided with a lug 17 by means of which the lever in the opening position of the lever 3 becomes engaged behind the edge 18 of the emptying spout 10 of the container 1 and thereby forces the cover 5 tightly against the container, so as to prevent unintentional opening of the cover 5 in the pouring out of the contents of the vessel.

In the exemplification according to Fig. 3 the cork stopper or the like 3 is provided at its top with a disc 20 and is retained thereon by the turning over of the edge of the disc. It is provided with a central sleeve 21 with interior threads and inserted in the cover 3. In the sleeve 21 the shaft or spindle 4 is screw-threadedly secured by its threaded extremity 22 and a spindle projects through a hole of the cap or cover 5 and through a recess of a transverse bar 23 provided on the inner side of the cover 5 in which the spindle 4 is guided which at its outer end is provided with the knob or handle 7. The stopper 3 may be easily and rapidly detached from the spindle by unscrewing therefrom, so as to allow of cleaning and exchanging it. The operation of the closure according to Fig. 3 is otherwise similar to that of the exemplification of Fig. 1 of the drawing. With a view of retaining solid particles in the container, such as for instance the coffee powder during the emptying of the container a strainer or sieve 24 may be disposed at any suitable point in the path of the discharged liquid, this strainer being for instance disposed in front of the spout 10, as shown in Fig. 3, but it may likewise be mounted within the neck of the insulating vessel 2 below the stopper 3.

It may be pointed out that the details of the construction hereinbefore described may also be carried out in a manner different from the representation shown in the drawing, thus for instance the guide sleeve 6 of Fig. 1 or the bracket 11 of Fig. 2, instead of being secured upon the cap or cover of the container, may be disposed upon the upper end of said container in which case the handles 7 and 16 are to be operated upon the outside of the top portion of the container instead of from the outside of the cover. Then, special means, not shown in the drawing, may be provided for the purpose of locking the stopper 3 in the closing position on the container 1 or on the cover or cap 5 or on both of these parts, in order to prevent unintentional lifting of the stopper by the overpressure prevailing in the insulating vessel. For this purpose an adjustable locking means may be provided for instance which may be caused to engage the stopper or any of the parts connected therewith and to be disengaged therefrom.

The invention also admits of other modifications and changes except as otherwise appears from the appended claims.

I claim:—

1. A heat insulating container comprising an outer casing and an inner casing spaced therefrom for the heat insulation of fluid in the inner casing, said outer casing having an outlet above the top of the inner casing and said outer casing extending above the top of the inner casing and having a lid to form a chamber between the top and upwardly extended outer casing, the top of the insulating portion forming the bottom of said chamber, said insulating portion having a neck portion, a stopper to fit into said neck portion, means extending from the lid of said chamber through the chamber and connected to said stopper, said means extending above the chamber top and adapted to be manually operated to lift the stopper from its seat in the bottom of the chamber without opening the lid, whereby said stopper may be raised from its seat without raising the lid of the chamber.

2. A heat insulating container comprising an outer casing and an inner casing spaced from the outer casing for insulating purposes, the wall of the outer casing terminating in a chamber above said insulating portion, said chamber having a top hinged to said outer casing which top when elevated affords access to the chamber, said chamber having a floor forming the top of the insulating portion of the container, said floor having an opening and a stopper therefor seating within the top of the insulating portion of the container, said container having a spout above said floor constituting the top of the insulating portion, and means connected with said hinged top for raising said stopper when the top is turned on its hinge to be opened, the top of said stopper being spaced from the hinged top of said chamber.

3. A heat insulating container comprising an outer casing, an inner casing spaced from the outer casing for heat insulating purposes, said outer casing being extended above the top of the inner casing and having a hinged top to form a chamber with the top of the inner casing forming the bottom of the chamber, the top portion of the inner casing forming a neck portion, a stopper seated in the neck portion with its top spaced from said hinged top of the chamber, a spout on the side of the chamber and means extending down from said hinged top through said chamber to said stopper to raise it from its seat to allow liquid to be poured from said spout.

WALTER VOSS.